(12) United States Patent
Chen et al.

(10) Patent No.: US 7,214,360 B2
(45) Date of Patent: May 8, 2007

(54) CARBON NANOTUBES FABRICATION AND HYDROGEN PRODUCTION

(75) Inventors: Ping Chen, Singapore (SG); Zhitao Xiong, Singapore (SG); Jianyi Lin, Singapore (SG)

(73) Assignee: National University of Singapore, Singapore (SG)

( * ) Notice: Subject to any disclaimer, the term of this patent is extended or adjusted under 35 U.S.C. 154(b) by 496 days.

(21) Appl. No.: 10/286,214

(22) Filed: Oct. 31, 2002

(65) Prior Publication Data

US 2003/0129122 A1    Jul. 10, 2003

Related U.S. Application Data

(60) Provisional application No. 60/330,804, filed on Oct. 31, 2001.

(51) Int. Cl.
*D01F 9/12* (2006.01)
(52) U.S. Cl. .................... 423/447.3; 977/843
(58) Field of Classification Search .......... 423/447.3
See application file for complete search history.

(56) References Cited

U.S. PATENT DOCUMENTS

| | | | |
|---|---|---|---|
| 4,273,676 A * | 6/1981 | Matsumoto et al. | 502/209 |
| 4,518,575 A * | 5/1985 | Porter et al. | 423/447.3 |
| 4,749,671 A * | 6/1988 | Saito et al. | 502/64 |
| 5,569,635 A * | 10/1996 | Moy et al. | 502/185 |
| 6,315,977 B1 | 11/2001 | Cantacuzene | 423/651 |
| 6,333,016 B1 * | 12/2001 | Resasco et al. | 423/447.3 |
| 6,413,487 B1 * | 7/2002 | Resasco et al. | 423/447.3 |
| 6,455,021 B1 | 9/2002 | Saito | 423/447.1 |
| 6,627,598 B1 * | 9/2003 | Ingram et al. | 510/507 |

OTHER PUBLICATIONS

John W. Halloran, "Ceramics and Glass" Copyright 1991, ASM International, Engineered Materials Handbook, vol. 4, pp. 109-114.*

Bacsa, Revathi R., et al. "*(Mg, Co) O Solid-Solution Precursors for the Large-Scale Synthesis of Carbon nanotubes by Catalytic Chemical Vapor Deposition*" Journal of the American Ceramic Society 85(11): 2666-2669 Nov. 2002.

Zeng, Xiaoshu, et al. "*Production of multi-wall carbon nanotubes on a large scale*" Physica B-Condensed Matter 323 (1-4): 330-332 Oct. 2002.

Mizuno and Misono, "Heterogeneous Catalysis" *Chem. Rev.* 98:199-217, 1998.

* cited by examiner

*Primary Examiner*—Steven Bos
*Assistant Examiner*—Paul Wartalowicz
(74) *Attorney, Agent, or Firm*—Klarquist Sparkman, LLP

(57) ABSTRACT

This invention relates to a method of producing multi-walled carbon nanotubes (MWNT) by catalytic decomposition of gaseous carbon-containing compounds over a transition metal-based catalyst. The catalyst comprises A-B and a support, wherein A is selected from the group VIII transition metal elements and B is selected from the Group VIB transition metal elements. An additional aspect of this invention includes a method of preparing hydrogen gas.

20 Claims, 6 Drawing Sheets

FIG. 4A  $3.6 \times 10^4$

FIG. 4B  $10 \times 10^4$

NiMgO-700

FIG. 4C  $2.9 \times 10^4$

FIG. 4D  $10 \times 10^4$ $Ni_4Mo_1Mg_4$-700

$10 \times 10^4$ $Ni_4Mo_1Mg_4$-800

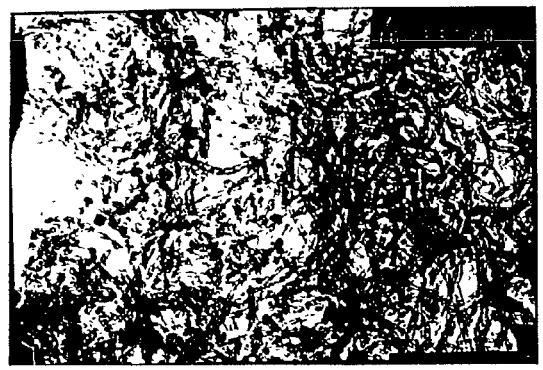
FIG. 4F  $10 \times 10^4$
$Ni_4Mo_1Mg_8\text{-}800$
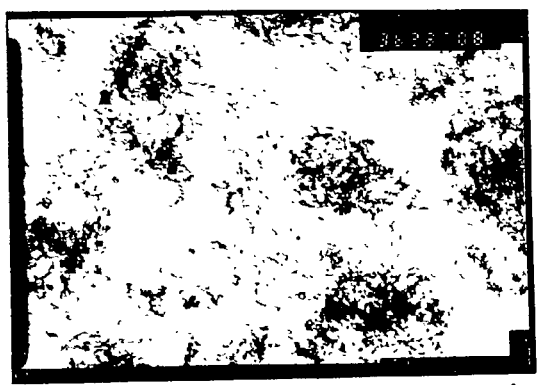
FIG. 4G  $3.6 \times 10^4$
FIG. 4H  $10 \times 10^4$
$Ni_4Mo_1Mg_{16}\text{-}800$
FIG. 4I  $10 \times 10^4$
$Ni_4Mo_1Mg_{20}\text{-}800$
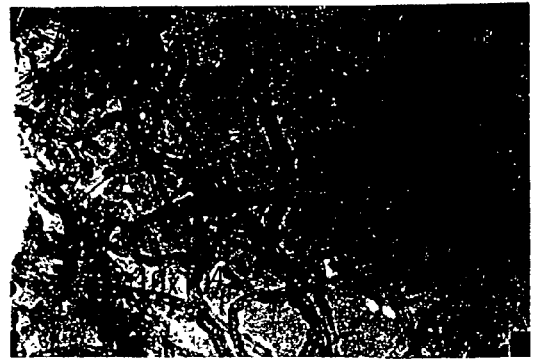
FIG. 4J  $19 \times 10^4$

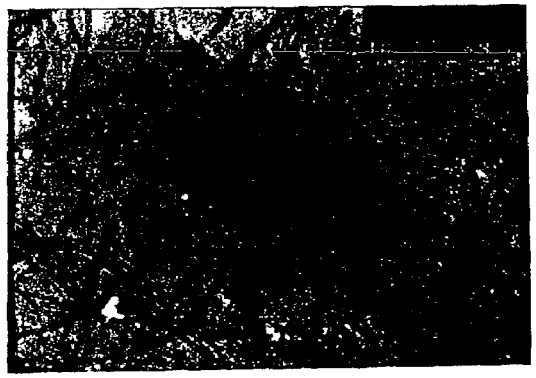
FIG. 4L  $10 \times 10^4$
FIG. 4M  $19 \times 10^4$
$Ni_4Mo_1Mg_{24}$-800
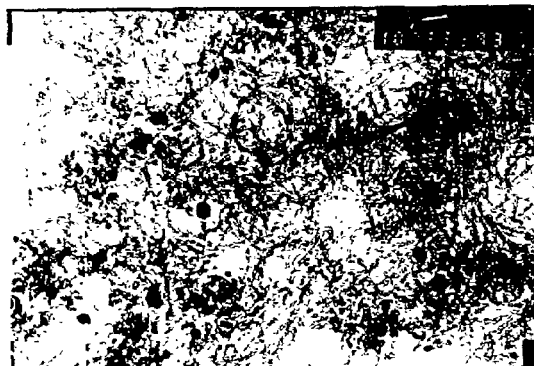
FIG. 4N  $10 \times 10^4$
FIG. 4O  $19 \times 10^4$
$Ni_4Mo_1Mg_{32}$-800
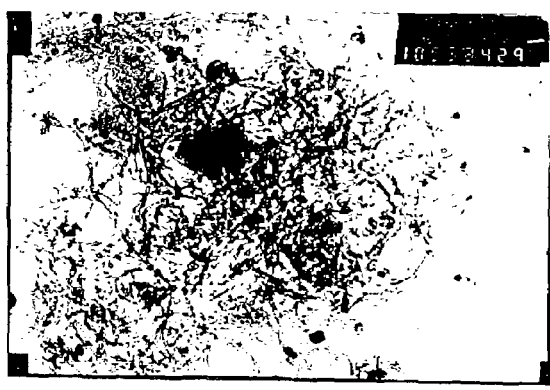
FIG. 4P  $10 \times 10^4$
FIG. 4Q  $19 \times 10^4$
$Ni_4Mo_1Mg_{40}$-800

CARBON NANOTUBES FABRICATION AND HYDROGEN PRODUCTION

This application is related to U.S. Provisional Patent Application Ser. No. 60/330,804, filed Oct. 31, 2001, entitled "carbon nanotubes fabrication and hydrogen production", the contents of which are hereby incorporated by reference.

FIELD OF THE INVENTION

This invention relates to a method of producing multi-walled, size-controllable carbon-nanotubes. Furthermore, a preferred aspect of this invention includes a method of preparing hydrogen gas.

BACKGROUND OF THE INVENTION

The discovery of carbon nanotubes [1] triggered a worldwide research effort devoted to determining their structure [2-6], calculating and measuring their physical properties [7-15], and to improving methods of production [16-33]. Carbon nanotubes have many extraordinary physical and chemical properties. For example, the Young's modulus of multi-wall carbon nanotubes has been calculated to be up to 1.4 times that of a graphite whisker, about 1 Tpa [34]; values derived from thermal vibration experiments performed on several multi-wall carbon nanotubes in a transmission electron microscope are in the 0.4–3.7 Tpa range [35]. Moreover, their flexibility is remarkable [36] and the bending may be fully reversible up to a critical angle value as large as 110° [37].

Carbon nanotubes have many applications. For example, they can be used as supports for metal catalysts, as in the case of a ruthenium cluster (range 3–7 nm) which can be deposited on nanotube surfaces [38]. As tubular structures, they have unusual capillary properties [39]. Mechanically, nanotubes are significantly stiffer than currently commercially available carbon fibres [40], and can therefore be used to strengthen composite materials or atomic force microscope tips. Theoretical calculations of their electronic structure indicate that due to their mesoscopic structure, nanotubes may exhibit quantum effects arising from their small diameter [41]. Of high technological interest is the encapsulation of metallic particles which display physical properties such as ferromagnetism or superconductivity [42]. Filled with metals or semiconductors, nanotubes may well provide components for nanoscale electrical or electronic devices such as amplifiers, switches or electrical-mechanical converters. Carbon nanotubes have also been shown to have hydrogen storage capabilities.

Three technologies have been applied in the synthesis of carbon nanotubes. They are carbon-arc discharge, laser-ablation and catalytic decomposition processes.

In the carbon arc-discharge method, carbon-nanotubes are grown between carbon electrodes in an inert gas atmosphere [1,16]. Catalytic species such as iron or cobalt can be used during the arc-discharge to improve both the productivity and the length of tubes. However, by this process, carbon-nanotubes are obtained as a mixture with several other carbon forms, including amorphous carbon and carbon particles. Thus, purification has to be carried out and the yield of nanotubes is no more than 2% [43].

Recently discovered, laser-ablation is a new method to prepare carbon nanotubes with high yield and purity. Usually, nanosecond pulses from a Nd:YAG laser were used to ablate a target of graphite-metal composite in a inert gas atmosphere maintained at 1473K [44-47]. The presence of a transition metal or a metal alloy, together with a carbon species, is essential to form carbon nanotubes. However, with the expensive laser generator, single-walled carbon nanotubes are the main target of this method.

The above two methods were designed mainly for carbon nanotubes synthesis on a laboratory scale and were used primarily for theoretical investigation. They do not seem suitable for the large-scale production of carbon nanotubes.

The third way to make carbon nanotubes is catalytic decomposition of hydrocarbons or other organic molecules (e.g. 2-methyl-1,2-naphthyl ketone) in the presence of supported transition metal catalysts [48-51], and this method is technically based on the route developed for the production of vapour-grown carbon fibres [52]. Ivanov et al. [51], Li et al. [53] and Mukhopadhyay et al. [54] reported the production of multi-walled carbon nanotubes with 3–8 nm inner, 5–25 nm outer diameters, and up to 60–100 μm in length with remarkable efficiency at low temperature. Colomer et al. [55] have shown different methods to remove the catalyst particles and the amorphous carbon from the nanotubes samples produced by catalytic method. Since it is straightforward to scale up both the preparation and the purification method, this route seems to be the most promising one for large scale industrial applications.

During the past decade, significant progress made in fuel cell technologies has prompted the exploration of replacing traditional central large power plants with so-called distributed power generators and a membrane fuel cell [56]. The latter technology generates electricity at locations where it is to be used, and therefore eliminates the loss of electricity due to transmission. In addition, the fuel cell process does not emit any environmental pollutants such as $NO_x$, $SO_x$ and other hydrocarbons. As a result, such a process becomes attractive for the automobile industry as well, since vehicles can then be propelled by electricity produced from an on-board fuel cell rather than by an internal combustion engine [57,58].

The current proton-exchange membrane (PEM) fuel cells utilize hydrogen gas as the energy source and require the elimination of carbon monoxide (ideally below 20 ppm) from the hydrogen stream to prevent poisoning of the electrocatalysts. Hydrogen gas is typically produced through steam reforming of methanol in vehicles [57-59] and through steam reforming, partial oxidation or autothermal reforming of natural gas for stationary uses [60,61]. In all these cases, however, carbon monoxide is a co-product, which has to be converted into carbon dioxide in subsequent steps.

An alternative route is directly cracking the hydrocarbon fuel into hydrogen and carbon. In this case, formation of carbon oxides is avoided and the need for downstream reactions such as water-gas shift and selective oxidation is eliminated. This approach has not been extensively studied, except for hydrogen production via the catalytic cracking of methane [62]. Recently, Muradov[63] studied the use of iron oxide as a catalyst for the cracking of methane and reported that equilibrium conversions were achieved at temperature above 1073K. The iron oxide also appeared to maintain its activity for several hours, in contrast to a $Pt/Al_2O_3$ catalyst which deactivated within minutes under similar conditions.

Furthermore, Ishihara et al. [64,65] reported that methane cracking takes place at low temperatures over a 10% Ni/SiO2 catalyst, which does not deactivate even after approximately 200 carbon per nickel atoms have been deposited on it.

BRIEF SUMMARY OF THE INVENTION

The present invention relates to the production of multi-wall carbon nanotubes (MWNT). In one aspect the invention provides a method for multi-wall carbon nanotube production by catalytic decomposition of gaseous carbon-containing compounds over a transition metal-based catalyst comprising A–B and a support, wherein A is selected from the Group VIII transition metal elements and B is selected from the Group VIB transition metal elements.

Support systems include $SiO_2$, $SiO_2/Al_2O_3$, aero-gel $Al_2O_3$ and MgO. The preferred support is. Of the Group VIII metals Fe, Co and especially Ni are preferred. Of the Group VIB metals Cr, Mo and W, Mo is preferred. This invention also relates to the preparation of catalysts used for the production of MWNT. These transition metal catalysts are of the type $A_xB_yMg_zO$ and the reduced form $A_xB_yMg_z$, where A is from among the Group VIII transition metal elements, while B is from among the Group VIB transition metal elements. The reduced form is a preferred embodiment. Particular mention is made of $Ni_xMo_yMg_zO$ catalysts. The reaction equipment used in this invention can be a fix-flowing-bed reactor or, more preferably, a fluidized-bed reactor. During MWNT preparation, the fluidized-bed reactor allows for full agitation of the catalyst due to the force of high-speed feedgas, which means that the catalyst can mix with the feedgas sufficiently and react readily.

Use of Mo as a promoter to the catalyst Ni—Mg—O results in a greater production of carbon nanotubes. More importantly, with Mo as a promoter, a high yield (406.5%) of carbon nanotubes was obtained upon increasing the Mg:Ni molar ratio from 1:1 to 5:1, whereas the yield of carbon nanotubes on a Ni—Mg—O catalyst decreased from 204.8% to 21% upon increasing the Mg:Ni molar ratio from 1:1 to 2:1.

In a preferred embodiment of this invention, a large amount of hydrogen gas is produced in the process of carbon nanotubes synthesis. If the catalyst, for example the $Ni_xMo_yMg_zO$ catalyst, is pre-reduced by hydrogen, no oxygen-containing compounds are produced during carbon nanotube synthesis. The main components in the tail gas are the non-reacted carbon-containing feedgas, preferably methane; and hydrogen-gas. When using an oxygen-free hydrocarbon feedgas there can be obtained hydrogen gas of a purity suitable for use in PEM fuel cells, with a CO content less than 20 ppm.

Other transition elements may also be added to Ni—Mg—O catalysts as a promoter to yield MWNTs, in place of, or in addition to molybdenum. These elements can be selected from Group VIB such as Cr, W etc., including mixtures thereof.

The carbon source used for catalytic decomposition to form MWNTs can be aliphatic hydrocarbons or aromatic hydrocarbons or a mixture thereof. The carbon source may be selected, for example, from methane, ethane, propane, butane, benzene, butene, cyclohexane, ethylene, acetylene, carbon monoxide, etc. The feedgas is introduced at a flow rate of from 10 L/h-g-catal to 100/h-g-catal, preferably from 10 L/h-g-catal to 30 L/h-g-catal, and more preferably from 10 L/h-g-catal to 12 L/h-g-catal. Furthermore, the production of multi-wall carbon nanotubes is carried out at a pressure of from 0.1 MPa to 10 MPa.

Inorganic acids can be used to remove the catalyst particles from the MWNTs formed. Examples of inorganic acids include $HNO_3$, $HCl$, $H_2SO_4$, etc.

DETAILED DESCRIPTION OF THE INVENTION

A preferred $Ni_xMo_yMg_zO$ catalyst was prepared by the following wet chemistry procedure: 5.8 g $Ni(NO_3)_2.6H_2O$, 5.12 g $Mg(NO_3)_2.6H_2O$ and 0.882 g $H_{24}Mo_7N_6O_{24}.4H_2O$ powder were mixed thoroughly according to a given Ni:Mo:Mg=4:1:4 molar proportion.

It is not essential, although preferable to add a swelling agent such as citric acid or urea to the mixture. Citric acid can be added in an amount equal to the total weight of the powder mixture, followed by the addition of de-ionized water to form a solution. It should be noted that the amount of swelling agent added does not necessarily have to equal the total weight of the powder mixture; rather it should be added in an amount so as to ensure swelling of the catalyst. Swelling increases the specific area of catalyst particles, which in turn, leads to the synthesis of uniform, small-diameter MWNTs.

It should also be noted that the amount of de-ionized water added to the starting materials desirably should not be less than 200 ml per 10 grams of total solid so as to assist in complete mixing with the starting powder material.

The solution was evaporated, for example, at about 473K. After it swelled and was crushed, the resulting solid was heated, for example to about 773K, for nitrate decomposition, and then calcined in a temperature, for example in the range of about 973K to about 1073K in air for at least 5 hours. The final result was a primrose and fluffy sample of $Ni_4Mo_1Mg_4O$ catalyst precursor.

As a variation of the above procedure, MoO can be used instead of molybdenum salts as the starting material. In this case, the Mg and Ni-salts are mixed mechanically with MoO. It is then preferable to add de-ionized water as an intermediate step. The resulting powder mixture is then calcined without the addition of a swelling agent. Similarly, ammonium heptamolybdate can be used as a starting material; the resulting powder mixture does not require a swelling agent as an intermediary step towards the production of the Ni—Mo—Mg—O catalyst.

$Ni_xCr_yMg_zO$ and $Ni_xW_yMg_zO$ catalysts were prepared in a similar manner. In the case of Cr, examples of suitable starting materials include ammonium chromate or chromium nitrate; the case of W, ammonium tungstate is an example of a suitable starting salt.

In the $Ni_xB_yMg_zO$ catalysts, wherein B is Mo, Cr, or W, the molar ratio Ni:B is in the range of 1:1 to 20:1, preferably in the range 1:1 to 8:1; while the molar ratio Ni:Mg is in the range of 1:1 to 1:100, preferably in the range 1:1 to 1:10.

In all subsequent discussions, the calcination temperature used to prepare the catalyst is affixed to the catalytic formula and designated in terms of ° C. As an example, the aforementioned catalysts are designated as either $Ni_4Mo_1Mg_4O$-700 or $Ni_4Mo_1Mg_4O$-800.

Figure 1A:
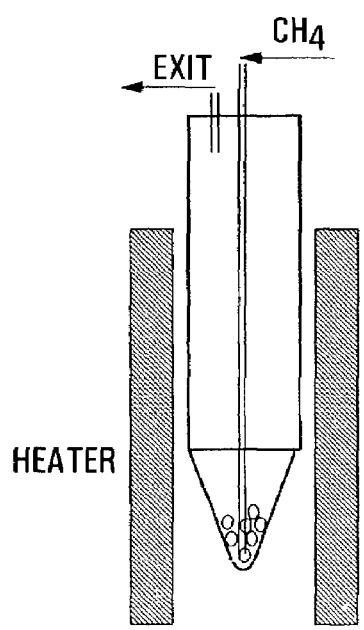
FIGS. 1a and 1b are schematic diagrams of a fluidized-bed reactor and a plug-flow fix-bed reactor, respectively.

A preferred embodiment of a reactor for use in this invention is the fluidized-bed reactor, the structure of which is illustrated in FIG. 1a. About 200–500 mg of catalyst (>150 mesh) was used in each preparation. The catalyst was heated to 973K in an atmosphere of hydrogen gas. In a preferential embodiment, the catalyst was maintained at the same temperature for an additional period of time, suitably about 30 minutes, in order to be reduced. Thereafter, a carbon-containing feedgas such as pure methane (>99.99%) was introduced at a flow rate of 10–12 L/h to start the carbon nanotubes fabrication. The reaction of the carbon-containing feedgas can be carried out in the temperature range of about 673K to about 1173K, preferably at about 973K. Generally, the reaction time was controlled to be of the order of about 1–2 h, the conversion of methane was about 30% and nearly all methane was converted to carbon materials and hydrogen; 99% of the carbon product was in the form of MWNTs. The yield of carbon nanotubes, Y, is defined as follows:

$$Y_{Carbon\ nanotubes} = \frac{M_{After\ reaction}^{Catalyst+Carbon\ Nanotubes} - M_{Before\ reaction}^{Catalyst}}{M_{Before\ reaction}^{Catalyst}} \cdot 100\%$$

Where $M_{before\ reaction}$ and $M_{after\ reaction}$ are the weights of catalyst before and after reaction, respectively.

Figure 1B:
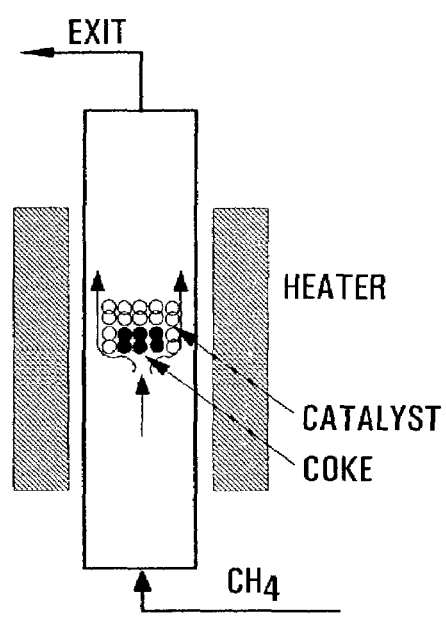

Compared to a plug-flow fix-bed reactor, good mass transfer and heat transfer are primary advantages of the fluidized bed reactor. With injection of feedgas, the catalyst in the fluidized bed reactor is forced to fully agitate like boiling water, so that every catalyst particle can react with feedgas readily, while in a plug-flow fix-bed reactor (see FIG. 1b) the coke generated by the substrate catalyst can choke the routeway of feedgas to the superstratum of the catalyst, which can result in the inactivity of part of the catalyst and the reduction of the yield of carbon nanotubes.

Figure 2:
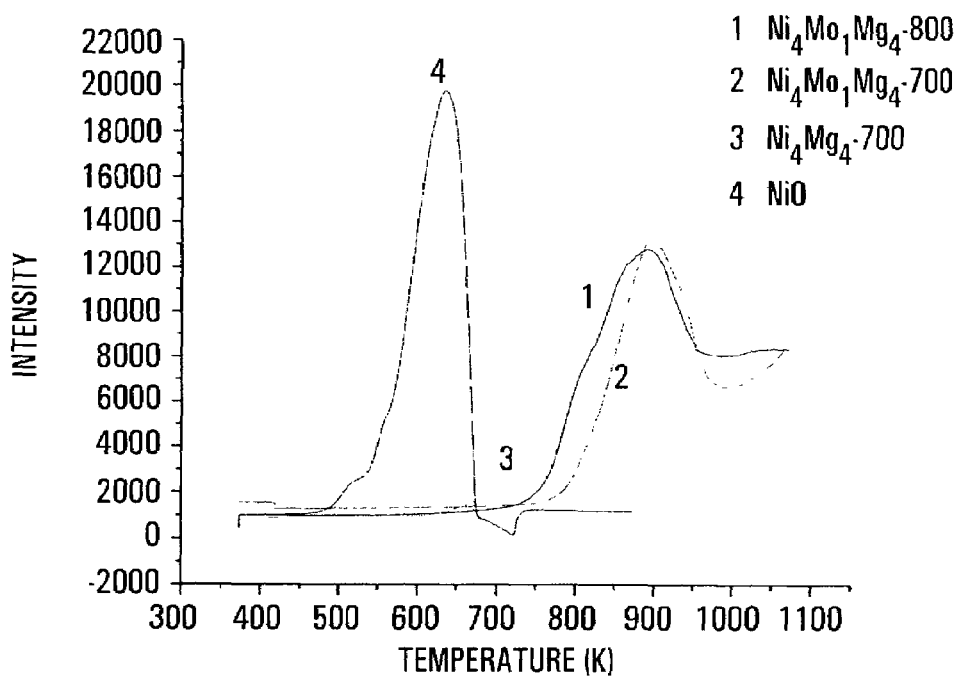
FIG. 2 shows Temperature Programmed Reduction (TPR) spectra of $Ni_xMo_yMg_zO$ and Ni—Mg—O catalysts. The sample was pretreated with Argon at 873K for 30 minutes, then cooled down to 373K and kept at this temperature. The gas composition was then shifted from pure Argon gas to a mixture of 10% $H_2$/90% Ar and the temperature was increased to 1073K at speed of 10K/min. The gas chromatography monitored the gas composition during the process.
Figure 3:
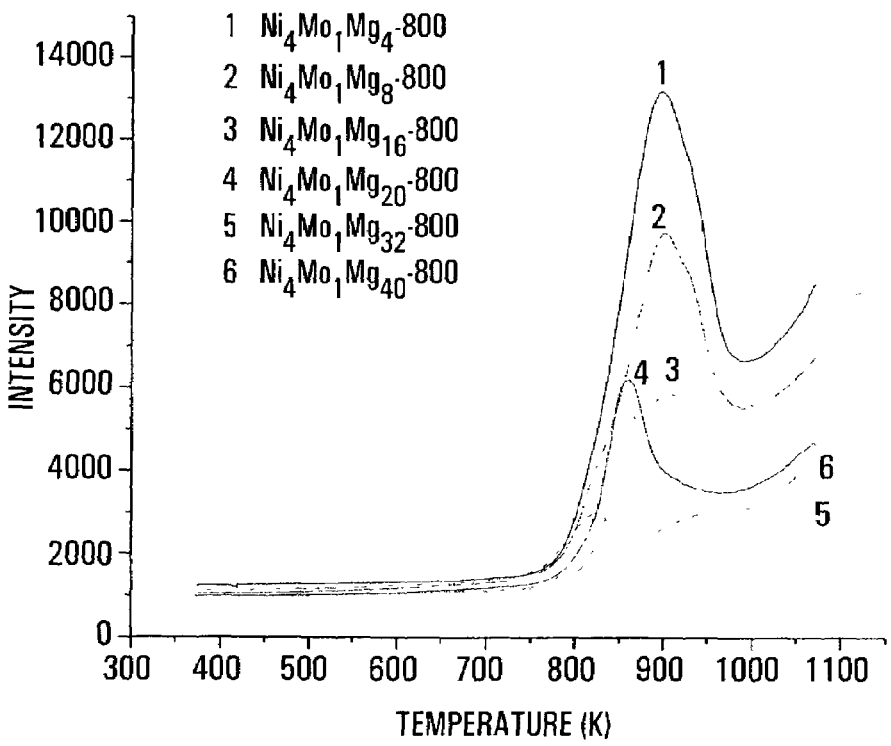
FIG. 3 shows $H_2$-TPR spectra of $Ni_xMo_yMg_zO$ catalysts with different Ni:Mo:Mg ratios.
Figure 4D:
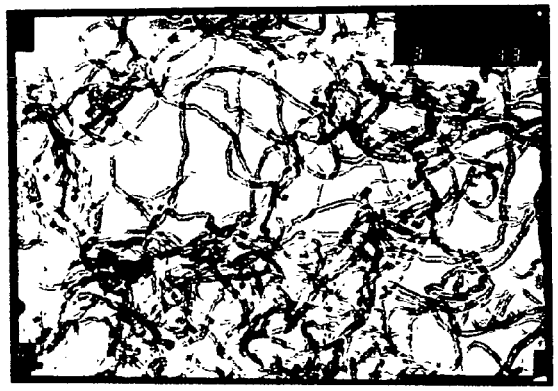
FIG. 4 shows Transmission Electron Microscopy (TEM) images of carbon nanotubes prepared by $Ni_xMo_yMg_zO$ catalysts with different Ni:Mo:Mg ratios. In each experiment about 200–500 mg of a $Ni_xMo_yMg_zO$ catalyst was placed in the fluidized-bed reactor; the catalyst was heated to a final temperature in the range of 573K–1073K, preferably 973K, in the presence of hydrogen gas at 15K/min; maintained at that temperature for 30 minutes for pre-reduction, after which the feedgas was changed to methane and reacted for 1 to 2 hours.
Figure 4D:
Figure 4D:
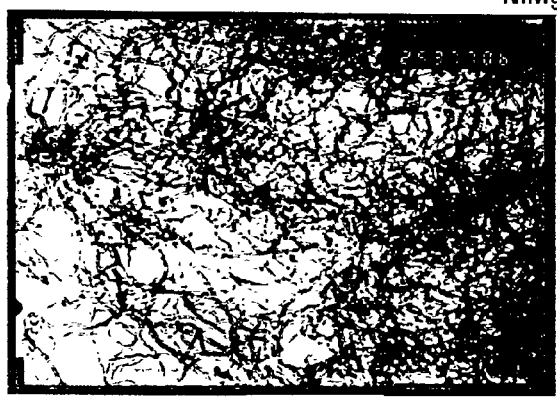
Figure 4D:
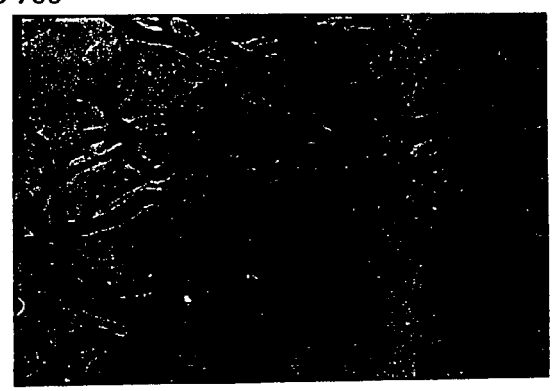
Figure 4D:

Without wishing to be bound by them, the inventors put forward the following comments. Ni—Mg—O is a catalyst for carbon nanotube preparation via catalytic routes. Since (a) NiO and MgO both possess a rock-salt type crystal structure, (b) the ionic radius of $Ni^{2+}$ (0.070 nm) is quite close to that of $Mg^{2+}$ (0.065 nm), and (c) the dimension of their crystal cells are very close to each other, the binary system consisting of NiO and MgO should form the solid solution $Ni_xMg_{1-x}O$ due to good miscibility between NiO and MgO. Therefore the Ni-component in the metal oxide phase of host-dopant type, $Ni_xMg_{1-x}O$, would be considerably difficult to reduce completely. This has been proved from the $H_2$-TPR result (see FIG. 2) wherein the $H_2$ consumption of the Ni—Mg—O catalyst decreased significantly as compared with the same scale of pure NiO and the maximum of the reduction peak increased from 643K to 723K. Though the formation of $Ni_xMg_{1-x}O$ solid solution may indicate that the reduction of NiO is under control so as to control the particle size of Ni metal, the low reduction ability of NiO also results in the poor yield of carbon nanotube fabrication. In order to solve this problem, Mo was added as a new component in the Ni—Mg—O system. Comparing the TPR result of Ni—Mo—Mg—O with that of Ni—Mg—O, it is found that the addition of Mo as a promoter enhances the reducibility of NiO, consuming far more hydrogen, while the increased maximum of the TPR peak (913K) means that the chemical reduction of NiO is still controllable. TEM results show that the carbon nanotubes prepared by the $Ni_4Mo_1Mg_4$-700 catalyst possess the same diameter range (20–40 nm) as those prepared by Ni—Mg—O catalysts. Furthermore, the yield of carbon nanotubes prepared by Ni—Mg—O catalysts was 200%, and increased to 800% when produced by the $Ni_4Mo_1Mg_4$-700 catalyst.

The economic production of multi-walled carbon nanotubes with uniform diameter distribution, on a large scale, was the most practical target for its industrial application. The diameter of carbon nanotubes produced via catalysis depends on the metal particle size of the catalyst. Therefore, a preferred embodiment of this invention is the use of small metal particle size. Although we do not wish to be bound by any theory, given that small metal particles easily congregate to form larger particles which are not of benefit for the growth of small-diameter carbon nanotubes, a decrease in the loading of NiO presented a feasible way in which to obtain smaller metal particle size distribution. TPR results of Ni—Mo—Mg—O catalysts with different Ni:Mo:Mg ratios showed that by decreasing the Ni:Mg ratio, the TPR peak became sharper, which implies a smaller catalyst particle size. When Ni:Mg reached 1:8, the integration under TPR curve became very weak in intensity, which may suggest a strong interaction between Ni, Mo and Mg components. Although other characterizations are necessary to study the particle size variation, the TEM results of carbon nanotubes produced by the Ni—Mo—Mg—O catalyst with different Ni:Mo:Mg ratios indicated that the carbon nanotubes became thinner as the Ni:Mg ratio decreased.

As the amount of Ni in the catalyst decreases, the diameter of the formed nanotubes also decreases. Hence, the diameter of nanotubes can be controlled by varying the amount of Ni in the catalysts. As the Ni content is decreased, the yield of nanotubes also decreases, so a balance must be sought between the carbon nanotube diameter and yield.

The diameter distribution and the yield of carbon nanotubes prepared by $Ni_xMo_yMg_z$ catalysts are summarized in Table 1 below.

In one embodiment, purification was carried out after the preparation of carbon nanotubes as follows: 3–4 g of synthesized raw carbon nanotubes were immersed in 300 ml of an acid, 1M $H_2SO_4$ to dissolve the catalyst particles attached at the extremities of the nanotubes. The solution was stirred for 5 hours, followed by removal of the solution containing $Ni^{2+}$, $Mo^{n+}$ (where n=4 or 5) and $Mg^{2+}$ ions. The remaining precipitate was mixed with a low molecular-weight organic solvent, for example an alcohol such as isopropyl alcohol, and dispersed via electronic means such as sonication. The carbon nanotubes were washed with de-ionized water and dried, suitably at about 473K in a flow of an inert gas such as nitrogen gas.

A high yield of carbon nanotubes using $Ni_xMo_yMg_z$ type catalysts in a fluidized-bed reactor results in a low cost of synthesis, about S$0.5–1 (all monetary figures in Singapore dollars as of year 2001) per gram of carbon nanotubes. If two or more fluidized-bed reactors are connected in series to utilize the unreacted carbon-containing feedgas, the cost will be even lower. Compared with the price of a supplier abroad, about S$50 per gram of carbon nanotubes, this method may be the most economical way to synthesize multi-wall carbon nanotubes on a large scale and should be useful for future industrial applications.

Since methane possesses the most abundant hydrogen content of all known hydrocarbons, the process of cracking it directly into carbon and hydrogen may be the most promising way to generate hydrogen with high purity.

In a previous part of this patent application, a new series of Ni—Mo—Mg—O catalysts, combined with fluidized-bed reactor, were developed to synthesize carbon nanotubes on a large scale. After tracking the reaction with a gas chromatograph, no other components were found in the tail gas except non-consumed methane and a large amount of by-product—hydrogen gas, which means that nearly all the methane feedgas had been cracked over $Ni_xMo_yMg_zO$ catalysts into carbon and hydrogen gas, with the carbon mainly in the form of carbon nanotubes.

The following is an example of illustrating the $CH_4 \rightarrow C + 2H_2$ route in carbon nanotubes fabrication over $Ni_xMo_yMg_zO$ catalysts.

500mg of $Ni_4Mo_1Mg_{16}$-800 catalyst was put into fluidized-bed reactor. After being heated to 973K in hydrogen gas atmosphere, the sample was pre-reduced for 30 min, then the feedgas changed to methane with a flow rate of 11.52 L/h (or 23.04 L/h-g-catal).

The reactant was determined by a '102 Gas Chromatography'* numerical series manufactured by Shanghai Dahua Instrumental Corporation. The chromatography equipment was equipped with thermal conductivity detectors (TCD) and a 5 Å zeolite molecular sieve column; Argon was used as carrier gas. The conversion of methane was calculated by hydrogen output.

Trade-mark

Figure 5:
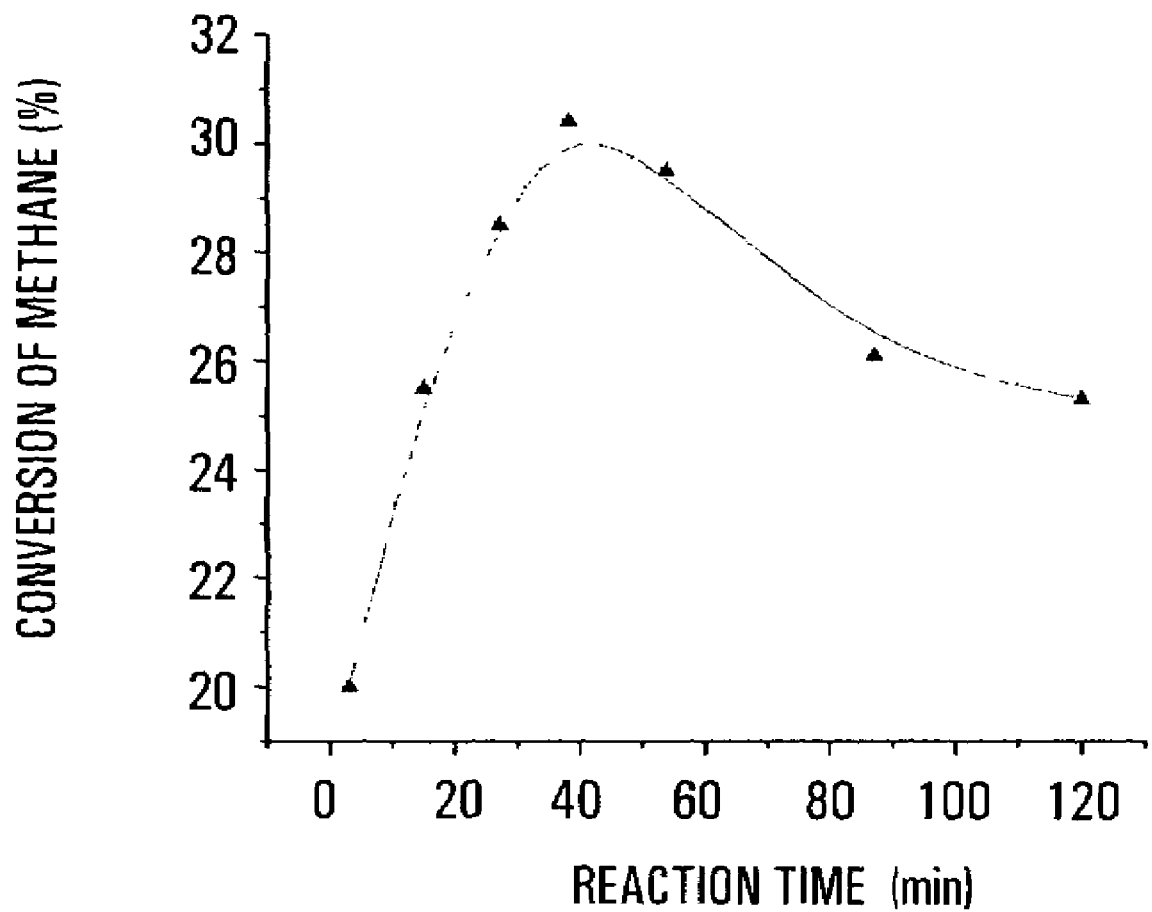
FIG. 5 shows a graph time effect on the methane conversion of $Ni_4Mo_1Mg_{16}$-800 catalyst.

From FIG. 5, it was found that the average conversion of methane during 120 minutes of reaction time was about 27%. According to the $CH_4 \rightarrow C + 2H_2$ route, there should be 3.33 g carbon produced. An experimental result of 3.52 g was obtained. TEM proved that nearly all the carbon was in the form of carbon nanotubes. Considering the error of methane conversion estimation, the above two numbers were very close.

The yield of hydrogen calculated was 24.9 L/h-g-catal.

After changing the carrier gas to hydrogen to obtain higher sensitivity, methane and hydrogen gas were still found to be the only gaseous elements. Even after prolonging the reaction time to more than 5 h, it was found that the activity of catalyst remained prominent, with a methane conversion rate of about 14%.

*Trade-mark

TABLE 1

The Summary of the Yield and the diameter of carbon nanotubes (CNT) prepared by $Ni_xA_yMg_zO$ (A=Cr, Mo, W) catalysts with different Ni:A:Mg ratio

| Catalyst $Ni_xA_yMg_zO$-T[1) | Sample Used (mg) | Reaction Time (h) | CNT Produced (mg) | Yield of CNT (%) | Diameter of CNT (nm) |
|---|---|---|---|---|---|
| $Ni_4Mo_1Mg_4O$-700 | 200 | 1 | 1000 | 500 | 20–30 |
|  | 400 | 2 | 3394 | 848.5 | 20–40 |
| $Ni_4Mo_1Mg_4O$-800 | 200 | 1 | 987 | 493.5 | 15–25 |
|  | 400 | 2 | 3278 | 819.5 | 15–30 |
| $Ni_4Mo_1Mg_8O$-800 | 200 | 1 | 1162 | 581 | 5–15 |
| $Ni_4Mo_1Mg_{16}O$-700 | 200 | 1 | 1216 | 630.5 | 7–15 |
|  | 500 | 2 | 3726 | 745.2 | 7–20 |
| $Ni_4Mo_1Mg_{16}O$-800 | 200 | 1 | 817 | 408.5 | 5–15 |
|  | 400 | 2 | 3142 | 785.5 | 5–15 |
| $Ni_4Mo_1Mg_{20}O$-800 | 200 | 1 | 497 | 248.5 | 5–10 |
|  | 400 | 2 | 1626 | 406.5 | 5–15 |
| $Ni_4Mo_1Mg_{24}O$-800 | 200 | 1 | 417 | 208.5 | 3–10 |
| $Ni_4Mo_1Mg_{32}O$-800 | 200 | 1 | 236 | 118 | 3–7 |
| $Ni_4Mo_1Mg_{40}O$-800 | 200 | 1 | 100 | 50 | 3–5 |
| $Ni_1Mg_1O$-700 | 200 | 1 | 203 | 101.5 | 25–40 |
|  | 400 | 2 | 819 | 204.8 | 30–40 |
| $Ni_1Mg_1O$-800 | 200 | 1 | 37 | 18.5 | 20–30 |
| $Ni_1Mg_2O$-700 | 200 | 1 | 42 | 21 | 15–30 |
| $Ni_1Mg_5O$-700 | 400 | 3 | 0 | 0 | — |
| $Ni_8Mo_1Mg_{40}O$-800 | 400 | 3 | 870 | 217.5 | 15–20 |
| $Ni_4Mo_1Mg_{20}O$-800 | 400 | 3 | 2256 | 564 | 10–15 |
| $Ni_2Mo_1Mg_{10}O$-800 | 400 | 3 | 2880 | 720 | 15–25 |
| $Ni_1Mo_1Mg_5O$-800 | 400 | 3 | 1820 | 455 | 10–20 |
| $Ni_4Cr_1Mg_{20}O$-800 | 400 | 3 | 1000 | 250 | 10–20 |
| $Ni_4Cr_1Mg_4O$-800 | 400 | 3 | 1720 | 430 | 25–40 |
| $Ni_4W_1Mg_{20}O$-800 | 400 | 3 | 300 | 75 | 10–15 |

[1)]x y z—the ratio of Ni/Mo/Mg in mol, T: Calcin temperature (° C.)

REFERENCE

1. S. Iijima, *Nature* (London), 1991, 354, 56.
2. X. F. Zhang, X. B. Zhang, Van Tendeloo, S. Amelinckx, M. Op De Beeck and J. Van Landuyt, *J. Crystal Growth*, 1993, 130, 368.
3. P. J. Harris, *Eur. Microsc. Anal.*, 1994, 9, 13.
4. G. Hu, X. F. Zhang, D. P. Yu, S. Q. Feng, W. Xu and Z. Zhang, *Solid State Commun.*, 1996, 98, 547.
5. D. Ugarte, *Microsc. Microanal. Microstruct.*, 1993, 4, 505.
6. L. A. Bursill, J. L. Peng and X. D. Fan, *Philos. Mag. A*, 1995, 71, 1161.
7. S. J. Tans, M. H. Devoret, H. Dai, A. Thess, R. E. Smalley, L. J. Geerligs and C. Dekker, *Nature* (London), 1997, 386, 474.
8. A. Y. Kasumov, I. I. Khodos, P. M. Ajayan and C. Colliex, *Europhys. Lett.*, 1996, 34, 429.
9. Y. Nakayama, S. Akita and Y. Shimada, *Jpn. J. Appl. Phys.*, 1995, 34, L10.
10. H. Dai, E. W. Wong and C. M. Lieber, *Science*, 1996, 272, 523.
11. L. Langer, L. Stockman, J. P. Heremans, V. Bayot, C. H. Olk, C. Van Haesendonck, Y. Bruynserade and J. P. Issi, *J. Mater. Res.*, 1994, 9, 927.

12. X. K. Wang, R. P. H. Chang, A. Pataashinski and J. B. Ketterson, *J. Mater. Res.*, 1994, 9, 1578.
13. D. H. Robertson, D. W. Brenner and J. W. Mintmire, *Phys. Rev. B*, 1992, 45, 12 592.
14. W. A. De Heer, W. S. Bacsa, A. Chatelain, T. Gerfin, R. Humfrey-Baker, L. Forro and D. Ugarte, *Science*, 1995, 268, 845.
15. R. Seshadri, A. Govindaraj, H. N. Aiyer, R. Sen, G. N. Subbanna, A. R. Raju and C. N. R. Rao, *Curr. Sci.*, 1994, 66, 839.
16. T. W. Ebbesen and P. M. Ajayan, *Nature* (London), 1992, 358, 220.
17. S. Iijima and T. Ichihashi, *Nature* (London), 1993, 363, 603.
18. D. S. Bethune, C. H. Kiang, M. S. de Vries, G. Gorman, R. Savoy, J. Vazquez and R. Beyers, *Nature* (London), 1993, 363, 605.
19. C. H. Kiang, W. A. Goddard, R. Beyers, J. R. Salem and D. Bethune, *J. Phys. Chem. Solids*, 1996, 57, 35.
20. S. Seraphin and D. Zhou, *Appl. Phys. Lett.*, 1994, 64, 2087.
21. T. W. Ebbesen, H. J. Lezec, H. Hiura, J. W. Bennett, H. F. Ghaemi and T. Thio, *Nature* (London), 1996, 382, 54.
22. C. Guerret-Plecourt, Y. Le Bouar, A. Loiseau and H. Pascard, *Nature* (London), 1994, 372, 761.
23. A. Thess, R. Lee, P. Nikolaev, H. Dai, P. Petit, J. Robert, D. T. Colbert, C. Xu, Y. H. Lee, S. G. Kim, A. G. Rinkler, D. T. Colbert, G. E. Scuseria, D. Tomanek, J. E. Fisher and R. E. Smalley, *Science*, 1996, 273, 483.
24. S. Witanachchi and P. Mukherjee, *J. Vac. Sci. Technol. A*, 1995, 3, 1171.
25. M. J. Yacaman, M. M. Yoshida, L. Rendon and J. G. Santiesteban, *Appl. Phys. Lett.*, 1993, 62, 657.
26. R. T. K. Baker and N. Rodriguez, *Mater. Res. Soc. Symp. Proc.*, 1994, 349, 251.
27. S. Herreyre and P. Gadelle, *Carbon*, 1995, 33, 234.
28. V. Ivanov, A. Fonseca, J. B. Nagy, A. Lucas, P. Lambin, D. Bernaerts and X. B. Zhang, *Carbon*, 1995, 33, 1727.
29. K. Hernadi, A. Fonseca, J. B. Nagy, D. Bernaerts, J. Riga and A. Lucas, *Synth. Met.*, 1996, 77, 31.
30. A. Fonseca, K. Hernadi, J. B. Nagy, Ph. Lambin and A. Lucas, *Carbon*, 1995, 33, 1759.
31. M. Endo, K. Takeuchi, K. Kobori, K. Takahashi, H. W. Kroto and A. Sarkar, *Carbon*, 1995, 33, 873.
32. A. Thess, R. Lee, P. Nikolaev, H. Dai, P. Petit, J. Robert, D. T. Colbert, C. Xu, Y. H. Lee, S. G. Kim, A. G. Rinkler, D. T. Colbert, G. E. Scuseria, D. Tomanek, J. E. Fisher and R. E. Smalley, *Science*, 1996, 273, 483.
33. A. Peigney, Ch. Laurent, F. Dobigeon and A. Rousset, *J. Mater. Res.*, 1997, 12, 613.
34. S. B. Sinnott, C. T. White and D. W. Brenner, *Mater. Res. Soc. Symp. Proc.*, 1995, 359, 241.
35. M. M. J. Treacy, T. W. Ebbesen and J. M. Gibson, *Nature* (London), 1996, 381, 678.
36. S. Iijima, C. Brabec, A. Maiti and J. Bernholc, *J. Chem. Phys.*, 1996, 104, 2089.
37. J. F. Despres, E. Daguerre and K. Lafdi, *Carbon*, 1995, 33, 87.
38. Planeix J. M., Coustel N., Coq B., Bronstons V., Kumbhar P. S., Dutartre R., Geneste P., Bernier P. and Ajayan P. M., *J. Am. Chem. Soc.*, 1994, 116, 7935.
39. Ajayan P. M., Ebbesen T. W., Ichihashi T., Iijima S., Tanigaki K. and Hiura H., *Nature*, 1993, 362, 522.
40. Treacy M. M. J., Ennesen T. W. and Gibson J. M., *Nature*, 1996, 381, 678.
41. Murakami Y., Shibata T., Okuyama K., Arai T., Suematsu H. and Yoshida Y., *J. Phys. Chem. Solids*, 1993, 54, 1861.
42. Subramoney S., *Proceedings of the Electrochemistry Society*, San Francisco, Calif., U.S.A., 22–27, May 1994.
43. K. Tohji, T. Goto, H. Takahashi, Y. Shinoda, N. Shimizu, B. Jeyadevan, I. Matsuoka, Y. Saito, A. Kasuhka, T. Oshuna, K. Hiraga and Y. Nishina, *Nature* (London), 1996, 383, 679.
44. Guo, T.; Nikolaev, P.; Thess, A.; Colbert, D. T.; Smalley, R. E., *Chem. Phys. Lett.* 1995, 236, 419.
45. Yudasaka, M.; Komatsu, T.; Ichihashi, I.; Iijima, S., *Chem. Phys. Lett.* 1998, 278, 102.
46. Yudasaka, M.; Komatsu, T.; Ichihashi, T.; Achiba, Y.; Iijima, S., *J. Phys. Chem. B* 1998, 102, 4892.
47. Yudasaka, M.; Ichihashi, T.; Iijima, S., *J. Phys. Chem. B* 1998, 102, 10201.
48. Baker, R. T. K., *Carbon*, 1989, 27, 315.
49. MotoJima S., Kawaguchi M., Nozaki K. and Iwagana H., *Appl. Phys. Lett.*, 1990, 56, 321.
50. Yudasaka M., Kikuchi R., Matsui T., Ohki Y., Yoshimura S. and Ota E., *Appl. Phys. Lett.*, 1995 67(17), 2477.
51. Ivanov V., Fonseca A., Nagy J. B., Lucas A., Lambin P., Bernaerts D. and Zhang X-B, *Carbon*, 1995, 33(12), 1727.
52. Endo M., *Chemtech.*, 1988, 18, 1512.
53. W. Z. Li, S. S. Xie, L. X. Qian, B. H. Chang, B. S. Zou, W. Y. Zhou, R. A. Zhao and G. Wang, *Science*, 1998, 274, 1701.
54. K. Mukhopadhyay, A. Koshio, T. Sugai, N. Tanaka, H. Shin-ohara, Z. and J. B. Nagy, *Chem. Phys. Lett.*, 1999, 303, Ko"nya117.
55. J.-F. Colomer, P. Piedigrosso, I. Willems, C. Journet, P. Bernier, G. van Tendeloo, A. Fonseca and J. B. Nagy, *J. Chem. Soc., Faraday Trans.*, 1998, 94, 3753.
56. K. Foger, in: H. E. Curry-Hyde, R. F. Howe (Eds.), *Natural Gas Conversion II*, Elsevier, Amsterdam, 1994, P. 115.
57. J. Haggin, C and EN, 8, Jul. 24 (1995).
58. R. A. Lemons, *J. Power Source* 29 (1990) 251.
59. J. C. Amphlett, A. M. Creber, J. M. Davis, R. F. Mann, B. A. Peppley, D. M. Stokes, *Int. J. Hydrogen Energy* 19 (1994) 131.
60. N. Dave, G. A. Foulds, *Ind. Eng. Chem. Res.* 34 (1995) 1037.
61. T. S. Cristensen, L. I. Primdahl, *Hydrocarbon Process* 73 (3) (1994) 39.
62. *Chem. Eng.* 69, 90 (1962).
63. N. Z. Muradov, Int. *J. Hydrogen Energy* 18 (1993) 211.
64. T. Ishihara, T. Fujita, Y. Takita, *Shokubai* 35 (1993) 324.
65. T. Ishihara, Y. Miyashita, H. Iseda, Y. Takita, *Chem. Lett.* (1995) 93.

The following specific examples are provided to illustrate the invention. It will be understood, however, that the specific details given in each example have been selected for purpose of illustration and are not to be construed as a limitation on the invention.

EXAMPLE 1

5.80 g of $Ni(NO_3)_2 \cdot 6H_2O$, 0.882 g of $H_{24}Mo_7N_6O_{24} \cdot 4H_2O$ and 5.12 g of $Mg(NO_3)_2 \cdot 6H_2O$ were mixed with 400 ml of de-ionized water. After stirring for 15 min, 11.8029 of citric acid was added; the resulting solution was further stirred. Simultaneously, water was evaporated by gradually heating to 473K. The mixture began to swell to some extent as it dried out. The resulting solid was crushed and calcined, first at 773K for 30 min and then at 1073K for 8 hours, to produce the $Ni_4Mo_1Mg_4$-800 catalyst.

400 mg of the $Ni_4Mo_1Mg_4$-800 catalyst was placed into a self-made fluidized-bed reactor. After being heated in hydrogen gas atmosphere with a flow rate of 17 L/h, from room temperature to 973K, the catalyst was pre-reduced for another 30 min at the same temperature. Then pure methane (>99.99%) was introduced at rate of 30 L/h-g-catal. After 2 h of reaction time, carbon nanotubes with multi walls were produced (about 3.278 g).

These raw carbon nanotubes were purified by mixing with 300 ml of 1M $H_2SO_4$, stirring for about 5 h to eliminate the catalyst particles, leaching the solution, then dispersing the nanotubes in 200 ml of isopropyl alcohol with a sonicator, leaching again and washing with de-ionized water and finally, drying at 473K in a flow of $N_2$. Pure multi-walled carbon nanotubes with a diameter range of 15–30 nm were thus obtained.

EXAMPLE 2

2.9 g of $Ni(NO_3)_2.6H_2O$, 0.441 g of $H_{24}Mo_7N_6O_{24}.4H_2O$ and 5.12 g of $Mg(NO_3)_2.6H_2O$ were mixed with 400 ml de-ionized water, stirred for 15 min, followed by the addition of 8.46 g of citric acid. The resulting solution was stirred and the water therein evaporated by gradually heating the solution to 473K. The mixture exhibited swelling to some extent when it dried out. Then the resulting solid was crushed and calcined, first at 773K for 30 min and then at 1073K for 8 hours, resulting in the $Ni_4Mo_1Mg_8$-800 catalyst.

EXAMPLE 3

Using 2.9 g of $Ni(NO_3)_2.6H_2O$, 0.441 g of $H_{24}Mo_7N_6O_{24}.4H_2O$, 10.24 g of $Mg(NO_3)_2.6H_2O$ and 13.581 g of citric acid and following the procedure of Example 2, a sample of the $Ni_4Mo_1Mg_{16}$-800 catalyst was prepared.

EXAMPLE 4

200 mg of $Ni_4Mo_1Mg_8$-800 catalyst of Example 2 were put into a self-made fluidized-bed reactor. After heating in hydrogen atmosphere with a flow rate of 17 L/h from room temperature to 973K, the catalyst was pre-reduced for another 30 min at the same temperature. Then pure methane (>99.99%) was introduced at a speed of 30 L/h-g-catal. After 1 h reaction, about 1.162 g of multi-walled carbon nanotubes with diameters in the range of 5–15 nm were produced.

EXAMPLE 5

Using 500 mg of $Ni_4Mo_1Mg_{16}$-800 catalyst of Example 3 and following the procedure of Example 4, 3.726 g of multi-walled carbon nanotubes with diameters in the range of 7–15 nm were produced after a reaction time of 2 hours.

EXAMPLE 6

Using different $Ni_xMo_yMg_z$-T catalysts and following the general procedure of example 4, multi-walled carbon nanotubes with different diameter distributions were produced. Examples are listed in Table 1.

EXAMPLE 7

The raw carbon nanotubes were purified by mixing 3–4 g of them with 300 ml of 1M $H_2SO_4$, stirring for about 5 h to eliminate the catalyst particles, leaching the solution then dispersing the nanotubes in isopropyl alcohol by sonication, leaching again, washing with de-ionized water and drying at 473K in a flow of $N_2$.

EXAMPLE 8

400 mg of $Ni_4Mo_1Mg_4$-700 catalyst was put into fluidized-bed reactor for carbon nanotube fabrication. After reduction by hydrogen with flow rate 17 L/h for 30 min and reaction with pure methane (flow rate 11.5 L/h) for 2 h, 3.394 g of carbon nanotubes was obtained. By analyzing the record of a gas chromatogram the average conversion of methane was calculated to be about 30%.

Economical estimation:

| Sample | $Ni(NO_3)_2.6H_2O$ | $Mg(NO_3)_2.6H_2O$ | $H_{24}Mo_7N_6O_{24}.4H_2O$ | Citric Acid |
|---|---|---|---|---|
| Price | 116.7S$/kg | 51.8S$/kg | 323.9S$/kg | 59.3S$/kg |
| Gas | | Methane | Hydrogen | |
| Price | | 82.3S$/M$^3$ | 5.15$/M$^3$ | |

According to the above market price of each reagent and gas, we calculated the value of multi-wall carbon nanotubes per gram as following:

The price of 1 g $Ni_4Mo_1Mg_4$-700 catalyst is S$0.523. The price of gas (hydrogen and methane) in the above experiment is about S$1.95. So the cost of carbon nanotube per gram is S$0.63.

EXAMPLE 9

Under the same conditions as example 7, a large amount of hydrogen can be produced simultaneously with the carbon nanotubes synthesis.

EXAMPLE 10

500 mg of an $Ni_4Mo_1Mg_{16}$-800 catalyst was put into fluidized-bed reactor. After being heated to 973K in hydrogen atmosphere, the sample was pre-reduced for 30 min. Then, the feedgas was changed to methane with a flow rate of 11.52 L/h (or 23.04 L/h-g-catal.). In first two hours of reaction the yield of hydrogen gas reached 24.9 L/h-g-catal.

EXAMPLE 11

Hydrogen is the only gaseous product in all carbon nanotubes fabrication processes.

The invention claimed is:
1. A method for the production of multi-wall carbon nanotubes which comprises preparing a Ni—Mo—MgO catalyst by mixing together salts of Ni, Mg and a molybdenum-containing compound;
   adding de-ionized water;
   evaporating the water;
   crushing the resulting solid and heating to form the Ni—Mo—MgO catalyst; and subjecting gaseous carbon containing compounds to decomposition over the Ni—Mo—MgO catalyst;
recovering multi-wall carbon nanotubes.

2. The method of claim 1, wherein the catalytic decomposition is carried out in a fluidized-bed reactor.

3. The method of claim 1, wherein the molar ratio of Ni:Mo is in the range of 1:1 to 20:1 and the molar ratio of Ni:Mg is in the range of 1:1 to 1:100.

4. The method of claim 1, wherein the molar ratio of Ni:Cr is from 1:1 to 20:1 and the molar ratio of Ni:Mg is from 1:1 to 1:100.

5. The method of claim 1, wherein the molar ratio of Ni:W is from 1:1 to 20:1 and the molar ratio of Ni:Mg is from 1:1 to 1:100.

6. The method of claim 1, wherein the carbon-containing material is selected from the group consisting of $CH_4$, CO, $C_2H_2$, $C_2H_4$, $C_2H_6$ and mixtures thereof.

7. The method of claim 1, wherein the multi-wall carbon nanotube production is carried out in a temperature range of from about 573K to about 1173K.

8. The method of claim 7, wherein the temperature range is from 673K to 1073K.

9. The method of claim 7, wherein the production of multi-wall carbon nanotubes is carried out at:
    (a) a gas flow rate of from 10 L/h-g-catal to 100 L/h-g-catal; and
    (b) a pressure of from 0.1 MPa to 10 MPa.

10. The method of claim 1, wherein the particle size of the catalyst is from 2 nm to 30 nm.

11. The method of claim 1, wherein the catalyst is subject to reduction at temperature of from 473 K to 1073 K, prior to catalytic decomposition.

12. The method of claim 1, wherein the multi-wall carbon nanotubes have an outer diameter of from 5 to 40 nm, and an inner diameter of from 2 to 7 nm.

13. The method of claim 2, wherein the catalytic decomposition is carried out in a series of fluidized-bed reactors.

14. The method of claim 1, wherein the catalyst is calcined in a temperature range of 700° C. to 800° C. for at least 5 hours.

15. The method of claim 1, wherein urea or citric acid is added as a swelling agent after mixing together salts of Ni, Mg and a molybdenum-containing compound and before adding de-ionized water.

16. The method of claim 1, wherein the molybdenum-containing compound is selected from the group consisting of $H_{24}Mo_7N_6O_{24} \cdot 4H_2$, MoO and ammonium heptamolybdate.

17. The method of claim 1, wherein the salt of Ni is a hydrate of $Ni(NO_3)_2$, and the salt of Mg is a hydrate of $Mg(NO_3)_2$.

18. The method of claim 1 further comprising purifying said recovered multi-wall carbon nanotubes with a strong acid.

19. The method of claim 1, wherein the gaseous carbon-containing compound also contains hydrogen.

20. The method of claim 1, wherein the catalyst is subjected to pre-reduction; the gaseous carbon-containing compound is methane and hydrogen gas is the only gaseous product.

* * * * *